United States Patent
Moini et al.

(10) Patent No.: US 6,375,905 B1
(45) Date of Patent: Apr. 23, 2002

(54) CORRUGATED METAL SUBSTRATE AND COATED PRODUCT FOR OZONE CONVERSION

(75) Inventors: Ahmad Moini, Princeton; Kenneth Charles Fisher, Hillsborough; Christopher R. Castellano, Edison; Jeffrey Barmont Hoke, North Brunswick; Ronald M. Heck, Frenchtown, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/502,677

(22) Filed: Feb. 11, 2000

(51) Int. Cl.$^7$ .............................. F24F 3/16; B01J 23/24; B01D 53/86
(52) U.S. Cl. ...................... 422/180; 422/173; 422/177; 422/198; 422/211; 422/222; 502/439; 502/324; 502/527.19; 502/527.21
(58) Field of Search ................................. 422/171, 177, 422/180, 173, 198, 211, 222; 29/890; 502/439, 324, 527.18, 527.19, 527.21

(56) References Cited

U.S. PATENT DOCUMENTS

| | | | |
|---|---|---|---|
| 3,542,124 A | * 11/1970 | Manfredo et al. | .......... 165/166 |
| 4,343,776 A | 8/1982 | Carr et al. | |
| 4,405,507 A | 9/1983 | Carr et al. | |
| 5,283,041 A | 2/1994 | Nguyen et al. | |
| 5,340,562 A | 8/1994 | O'Young et al. | |
| 5,422,331 A | 6/1995 | Galligan et al. | |

FOREIGN PATENT DOCUMENTS

| | | | |
|---|---|---|---|
| DE | 196 08 512 A1 | 9/1997 | .......... B01D/53/86 |
| EP | 0 635 685 A1 | 1/1995 | ............ F24F/3/16 |
| JP | 02273512 | 11/1990 | |
| WO | WO 98/06479 | 2/1998 | .......... B01D/53/86 |

OTHER PUBLICATIONS

Patent Application S.N. 09/151,784, filed Sep. 11, 1998, entitled "Device Containing Ozone Removing Composition for Attachement to Heat Exchanger Systems".
Patent Application S.N. 09/317,723, filed May 24, 1999, entitled "Method, Apparatus and Composition for Removing Pollutants from the Atmosphere".

\* cited by examiner

*Primary Examiner*—Hien Tran
(74) *Attorney, Agent, or Firm*—Richard A. Negin

(57) ABSTRACT

A metal substrate is fabricated and coated with a catalyst for ozone conversion of atmosphere passing through the substrate. A plurality of aluminum foil sheets that have been slit, stretched and twisted into a plurality of regularly repeating channels having geometrically shaped openings are serially positioned one on top the other to form a foil stack with channel openings partially blocked by channel walls of overlying foil sheets. Thicker covers with openings at the top and bottom of the stack form a sandwich and the sandwich pleated to form corrugations in a flexible but rigid sandwich substrate. The channel walls are coated with an ozone depleting catalyst which the ozone atmosphere contacts to remove ozone as the ozone atmosphere travels through the stack construction.

22 Claims, 3 Drawing Sheets

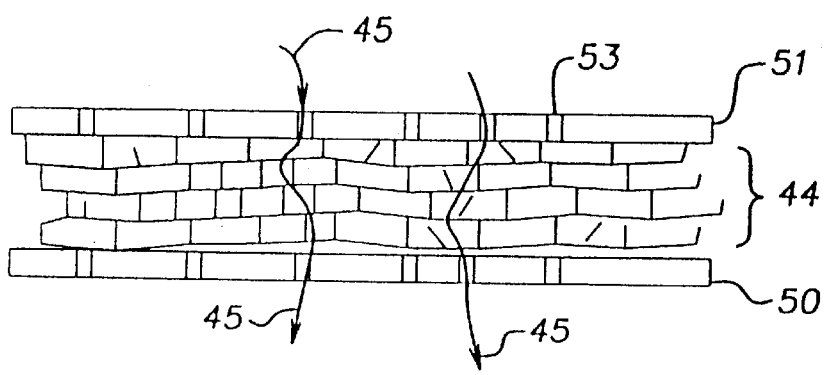
FIG. 7
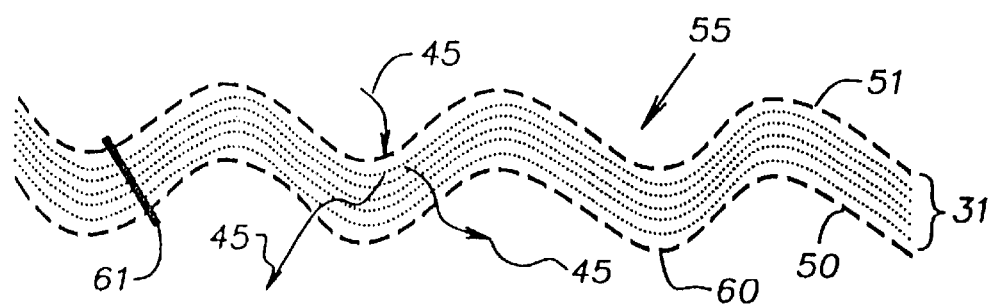
FIG. 8
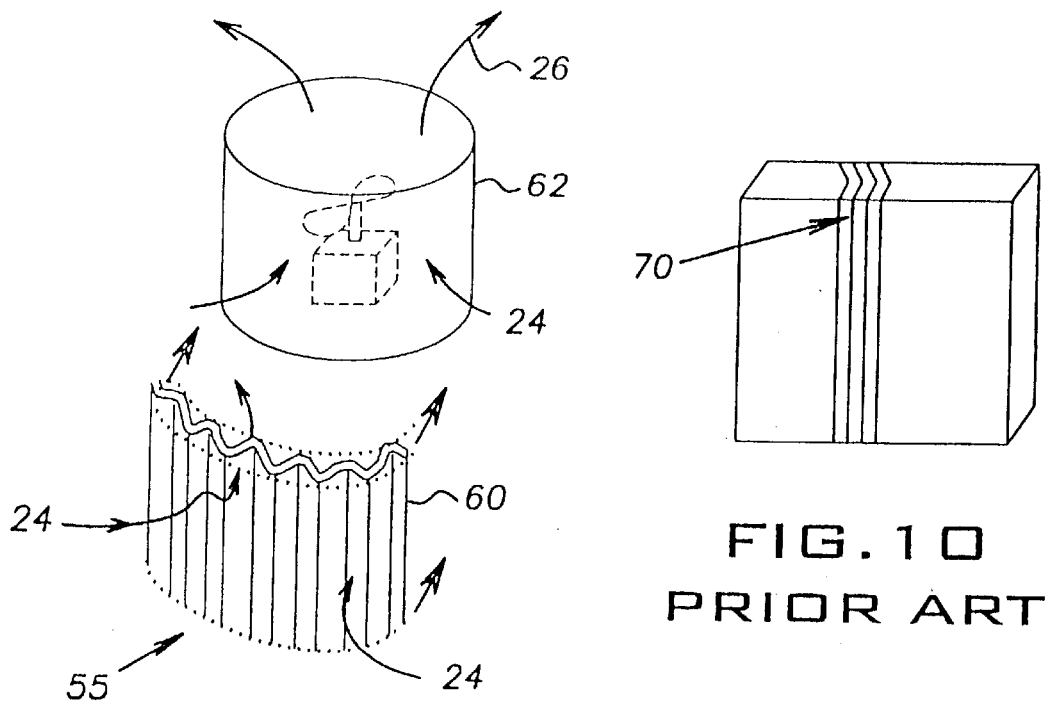
FIG. 9
FIG. 10
PRIOR ART

CORRUGATED METAL SUBSTRATE AND COATED PRODUCT FOR OZONE CONVERSION

This invention relates generally to a method and apparatus for removing ozone from a gas and more particularly to a stationary substrate attached to or formed as part of a heat exchange system through which an atmosphere containing ozone passes for conversion of ozone to oxygen.

The invention is particularly applicable to and will be described with reference to an air conditioning device employing an ozone converting substrate through which heated air passes. However, the invention, in its broader sense is not limited to air conditioning systems but can be applied to any heat exchange system in which atmosphere containing ozone circulates.

BACKGROUND

It is known to reduce the content of ozone from a gas through the employment of ozone removing compositions containing ozone removing materials (hereinafter "ozone depleting material"). Such materials can include, for example, ozone catalyzing compositions, ozone adsorbing or absorbing materials and the like. It is also known to coat surfaces, such as metal surfaces, with ozone removing compositions to enable such surfaces to promote the removal of ozone from a gas such as by the conversion of ozone to harmless byproducts. The coating of such surfaces can be done by spraying, dipping, brushing and the like.

Heat exchange systems such as air conditioners are well known. Typical of such systems is an inlet for receiving a stream of gas (e.g., air) often generated by an internally mounted fan. The stream of air comes into contact with a series of coils containing a refrigerant so that the ambient air cools the refrigerant which is eventually used to reduce the temperature of a second stream of air that typically circulates within a structure such as a residence or business facility.

It is known from copending and commonly assigned patent application Ser. No. 08/589,032 filed Jan. 19, 1996 to coat selected interior surfaces of heat exchange systems such as an air conditioner with an ozone removing composition. One example includes coating with an ozone catalyzing composition which converts ozone to harmless byproducts including oxygen.

In recent years public and private agencies have committed to reducing ozone levels in the atmosphere. The reduction of ozone is accomplished by passing a stream of gas containing ozone (e.g., the atmosphere) into operative contact with a composition formulated at least in part for removing ozone from the stream of gas. Some ozone removing compositions especially those employing ozone catalysts require elevated temperatures to be effective. As a result, separate free standing, expensive ozone removing facilities are required.

More recently, low temperature ozone removing compositions especially those employing ozone catalysts been developed such as disclosed in copending and commonly assigned U.S. patent application Ser. No. 08/589,182 filed on Jan. 19, 1996. These compositions can remove ozone at ambient temperatures and below. As a consequence, special requirements such as elevated temperatures are no longer required and surfaces in contact with the ambient atmosphere can be used as substrates for such ozone removing compositions.

A significant advance in the art of removing ozone from a gas suspected of containing the same (e.g., the atmosphere) is had by retrofitting heat exchange systems with a device containing an ozone removing composition which effectively removes ozone at low temperatures, in which the device is operatively attached to the external housing of an existing heat exchange system as disclosed in patent application Ser. No. 09/151,784. This provides an improvement to heat exchange systems so that they can remove ozone from a gas containing the same and do so through the use of an add on or retrofitted device.

There are a number of conventional porous substrates that have been used to carry the ozone depleting material and through which the atmosphere passes. While the prior art substrates function for their intended purpose, there are disadvantages or limitations associated with the prior art substrates. For purposes of this invention porous substrates may be classified into metallic and non-metallic substrates. This invention relates to metallic substrates.

Non-metallic substrates include porous foams such as polyurethane or polyester media, whether in woven or nonwoven form, plastics and ceramics. One problem with some non-metallic substrates is the flammability of organic substrate or the potential for flammability when coated with or in combination with the ozone depleting material. In the later instance, the ozone depleting material is with a fire retardant to minimize flammability of the substrate. Addition of a flame retardant reduces the ability of the ozone depleting material to convert ozone although improvements in ozone conversion have been made for specially formulated catalysts such as described in patent application Ser. No. 09/317,723. There is also a problem with adhesion attributed to organic materials which will be discussed further below. Additionally, porous foams lack rigidity and require special provisions for support.

It is known that metallic substrates containing an ozone depleting substance can use standard bonded aluminum materials. However, the bond between the aluminum plies or layers contains an organic component (polypropylene)which serves as a binder and raises the flammability concerns discussed above for the non-metallic substrates. A number of metallic substrates are disclosed in patent application Ser. No. 09/151,784. The metallic substrates disclosed include substrates in the form of a monolith or honeycomb having a plurality of channels of the type used in catalytic converters through which the atmosphere containing ozone flows. The channels are coated with an ozone depleting substance and can include any number of configurations. While the channels can be shaped to provide a tortuous path for the atmosphere flowing through the channels, at low flow rates there is a tendency towards laminar flow. There is also a limit on the tortuous flow path established by pressure drop considerations and also the fact that the channels have to be oriented to extend through the thickness of the substrate limiting the length thereof and their ability to establish gas/ozone depleting substance contact. Nevertheless, when the channels are shaped with bends or corrugations, the rigidity of the substrate is enhanced.

The metallic substrates disclosed in patent application Ser. No. 09/151,784 also include layers of wire mesh or knitted metal mesh coated with an ozone depleting catalyst. The mesh is coated with catalyst in a manner which plugs or fills select pores to establish a surface area contact with ozone containing atmosphere. Filling mesh openings with an ozone depleting catalyst to establish good atmosphere/catalyst contact while maintaining porosity is difficult. Further, mesh arrangements lack rigidity. Like porous foams, flexure of the mesh can dislodge the catalyst from openings in the grid. Accordingly, special provisions in transportation, handling and installation are required to maintain the mesh intact.

Separate and apart from substrates containing ozone depleting substances which are concerned with coatings, air/coating contact, adhesion, residence time etc., a variety of air filters have been and are in use in the HVAC and related fields. One type of air filter conventionally employed in the HVAC field to trap particulates and the like, uses sheets of aluminum foil which are slit, stretched and twisted into ribbons forming geometrically shaped passages. The formed foil sheets are stacked one on top of the other so that ribbons of one sheet overlie openings in adjacent sheets. As the stack increases in number, the passages are closed or reduced to very small size sufficient to trap foreign matter in the air stream passing through the filter. The foil, being aluminum, allows for periodic cleaning and reuse.

SUMMARY OF THE INVENTION

Accordingly, it is a principal object of the invention to provide a metallic ozone depleting substrate which overcomes the deficiencies of conventional ozone depleting substrates.

This object along with other features of the subject invention is achieved by the provision of an ozone substrate for heat exchange units which includes a plurality of metal foil plies positioned one on top of the other to form a stack. Each foil ply has a plurality of interconnected ribbons forming walls of a channel and comprises a plurality of channels adjacent one another. Each channel has geometrically shaped openings and the plies are stacked so that channel walls of overlying plies partially block channel openings of overlaid plies. A metal cover on each side of the stack forms a sandwich. The covers are thicker than the foil plies, span the plies and have cover openings formed therein for fluid communication with channel openings in said stack. At least one of the plies has an ozone depleting material applied to the channel walls thereof for removing ozone from ozone atmosphere as it passes through the sandwich. The channels provide rigidity while the openings in covers and plies establish a porosity at a desired minimal pressure drop. Importantly, the path of any atmosphere streamer through the substrate establishes thorough contact at some point of atmosphere travel with the passage walls to promote high conversion rates while retaining desired porosity, i.e., the streamers while passing through the thickness of the sandwich traverse the channels forcing contact with the channel walls coated with the ozone depleting material.

In accordance with another aspect of the invention, the foil plies are stretched to distort the geometric pattern of the channel opening and twisted to distort certain wall of each channel to increase the rigidity of each foil ply. Importantly, the covers with the stacked plies are pressed into pleated corrugations with the result that the pleated sandwich, by establishing a permanent set in the foil pleats and covers, has sufficient rigidity to be assembled into an outlet duct with only minimal frame support. Further and importantly, when the sandwich itself is pleated into corrugated form, the surface area of the substrate is materially increased causing a corresponding increase in ozone conversion efficiency. Additionally, the sandwich has flexibility to bend about the pleats or corrugations permitting the substrate to be coiled in roll form for shipment and storage and to be applied to cylindrical surfaces, such as a cylindrical air conditioning compressor housing, as well as flat outlet ducts. Still further, the sandwich can now be cut or sawed to a desired shape from a coiled roll for on site application eliminating any need to store substrates of a specified shape to match specific heat exchange housings.

In accordance with an important aspect of the invention, the substrate metal is aluminum totally lacking any organic compound and non-flammable. The ozone depleting material is a conventional catalyst, but one lacking any flame retardant because the metal sandwich is not flammable. Accordingly, the conversion efficiency of the ozone depleting material is improved. Importantly, adhesion of the catalyst to the surfaces of the foil plies and/or the covers is improved minimizing flaking of the ozone depleting material and allowing for the on-site application discussed above.

In accordance with another aspect of the invention, a method for forming an ozone substrate for use in heat exchange systems and the like is provided which includes the steps of a) slitting strips of metal foil into interconnected ribbons formed into channel walls having regularly repeating geometrically shaped openings extending throughout each foil strip; b) stretching and twisting each foil strip to distort the pattern of the geometric opening while twisting certain walls of each channel; c) stacking a plurality of the strips one on top the other so that channel walls of overlying foil strips partially block channel of overlaid foil strips; d) covering the top and bottom stacked strips with a thicker metal cover strip having openings therein to form a porous sandwich; e) pleating the sandwich including the covers into a corrugated form; and, g) applying an ozone depleting coating to at least one of the foil strips at the completion of steps (b) or (e). Importantly, because the channel walls, unlike mesh, have a depth, it is possible to dip or spray coat the substrate followed by high pressure, air flow through the substrate to remove excess ozone depleting catalyst which assures, upon drying of the ozone depleting catalyst, a coating only on the channel walls without blockage of the channels.

It is an object of the invention to provide a metallic ozone depleting substrate which has any one or combination of the following characters when compared to conventional substrates:

i) no organic components which render the substrate flammable or in combination with the ozone depleting material renders the substrate flammable;

ii) no need to add flame retardant compounds to the composition of the ozone depleting substance thereby increasing the conversion capacity of the ozone depleting substance;

iii) excellent atmosphere/ozone depleting material contact improving the efficiency of the substrate;

iv) improved adhesion contact between substrate and ozone depleting material minimizing flaking of the ozone depleting material when the substrate is bent into a curved shape or flexes or vibrates in use;

v) improved structural rigidity permitting the substrate to be mounted in any number of applications without the need for additional bracing or supports;

vi) improved flexibility permitting substrate to be bent in a two-dimensional plane for wrapping around cylindrical objects such as a/c condensers;

vii) ability to be cut, sawed or severed into a desired insert shape form from a coiled substrate roll thereby eliminating the need for stocking a wide variety of substrate shapes and sizes;

viii) improved ozone conversion efficiency resulting from increased surface area of the sandwich caused by pleating the sandwich into corrugated shape.

It is another object of the invention to provide an improved method for forming a metallic, ozone depleting substrate which allows for easy application of the ozone depleting material to the substrate.

Yet another object of the invention is to provide an improved ozone depleting substrate ideally suited for retrofit applications.

Still yet another object of the invention is to provide an ozone depleting substrate which is relatively easy to assemble and/or inexpensive.

Still another object of the invention is the use of a proven foil technique developed for filters as a part of a catalyst substrate thus assuring consistency and reliability in the substrate design.

These and other features, advantages and/or objects of the invention will become apparent to those skilled in the art upon reading and understanding the Detailed Description of the Invention set forth below taken in conjunction with the drawings described below.

BRIEF DESCRIPTION OF THE DRAWINGS

The invention may take form in certain parts and an arrangement of parts taken together and in conjunction with the attached drawings which form a part hereof and wherein:

FIG. 7 is a schematic side view showing the side covers laid on the stack to form a sandwich;

FIG. 8 is a schematic representation of the sandwich pleated into corrugated form;

FIG. 9 is a schematic representation of the substrate applied to a cylindrical, compressor housing for an air conditioning unit; and FIG. 10 is a schematic representation of a prior art monolithic type flow channel substrate.

DETAILED DESCRIPTION OF THE INVENTION

Figure 1:
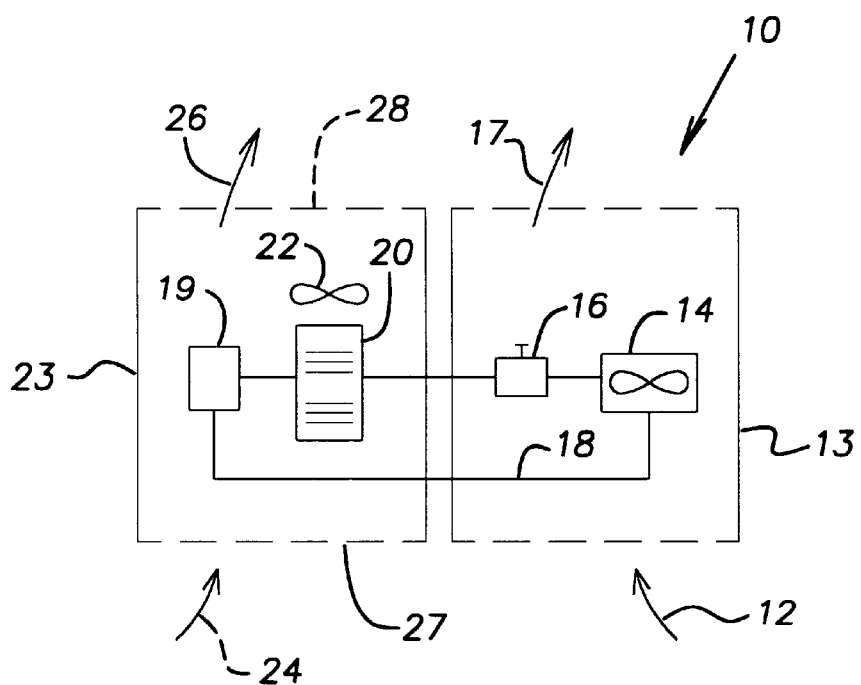
FIG. 1 is a schematic view of a heat exchange system.

Referring now to the drawings wherein the showings are for the purpose of illustrating a preferred embodiment of the invention and not for the purpose of limiting same, there is shown in FIG. 1 a conventional heat exchange system 10 indicative of a split air conditioning system.

For definitional purposes as used in this detailed description and in the claims, a "ozone atmosphere" includes any gas regardless of the number of components which contains ozone regardless of the concentration. Such gases include, for example, air, waste gases, discharge gases from industrial processes and the like. The term "ozone removing substance" includes any composition, material, compound and the like which can remove ozone from a gas by any means including chemical and physical means. Such compositions include by way of non-limiting examples, catalyst compositions, adsorbent compositions, absorbent compositions, polymeric compositions, and the like. The term "heat exchange system" includes one or more heat exchange units which is contained within a housing for example, a steel cage. The term "heat exchange unit" is used in its customary broad sense to include devices which treat fluids, gases or liquids, by increasing or decreasing the temperature of an incoming stream of fluid. By way of example, heat exchange units include heat pumps, refrigeration systems, air conditioning units and the like.

For illustration and discussion purposes only, this Detailed Description of the invention will apply to a heat exchange system of the air conditioning type, specifically a compressed fluid, split system air conditioner. As is well known, air within a cabin or building indicated by air streamer arrow designated by reference numeral 12 enters an inside housing 13 (typically situated within the cabin or building) which contains an evaporator coil 14 and an expansion valve 16. The air is cooled as it passes over evaporator coil 14 and exits inside housing 13 as cooled air indicated by cold air streamer 17. Heated refrigerant exits evaporator coil 14 through return line 18 and enters a compressor 19 and condenser 20 where the refrigerant in liquid form is sent to expansion valve 16. Compressor 19, condenser 20 and a fan 22 are typically provided in an outside housing 23 with fan 22 pulling ambient ozone containing atmosphere designated by ambient atmosphere streamer 24 into outside housing 23 into heat exchange contact with condenser 20 and exhausting atmosphere as shown by atmosphere streamer 26. As a matter of definition, outside housing 23 has some form of an inlet or an inlet duct designated by reference numeral 27 for taking in ambient atmosphere streamer 24 and some form of outlet or outlet duct 28 for exhausting spent atmosphere streamer 26. This invention inserts a substrate containing an ozone depleting substance, as described in detail below, into outlet duct 28 through which ozone atmosphere streamer 26 passes and in the process thereof, converts the ozone to another gaseous form, i.e., oxygen. Preferably the ozone depleting substance is placed in the flow of heated atmosphere where its ozone conversion is enhanced. However, the invention is not limited to a placement position of the ozone depletion substance and it can be applied anywhere in the atmosphere flow path including inlet 27.

The inventive ozone depleting substrate is a composite or fabrication of metal foil sheets or strips stacked one on top the other and covered or encased between metal side covers to form a sandwich which is held together by periodically spaced metal staples. The invention may best be explained by describing the procedures used in assembling or fabricating the substrate.

Figure 2:
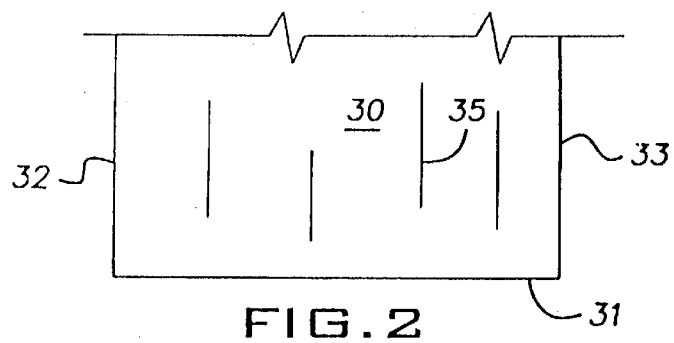
FIG. 2 is a plan partial view of a slitted foil.

Referring now to FIG. 2, there is shown a plain strip of metal foil 30. For orientation purposes only, and not for use in an absolute sense, foil strip 30 extends in a longitudinal direction (about which it is coiled as explained below) from a leading edge 31 to a trailing edge which is not shown and from a left hand side edge 32 to a right hand side edge 33. For discussion and explanatory purposes, foil strip 30 has a plurality of slits 35 shown formed when the foil is flat. In practice, slits 35 will be formed simultaneously with the shaping of foil strip into its initial substrate form. They are shown in FIG. 2 because it is important to the invention to form a rigidized sheet foil sheet by slitting, bending, stretching and twisting the sheet into a desired shape. The shape of the foil illustrated in the preferred embodiment is that of a conventional foil used in HVAC filter applications and the method by which the foil plies are formed is conventional. FIG. 2 is presented to merely show that conceptually, it is possible to produce a sandwich assembly by first cutting slits in the foil when the foil is flat followed by stretching the foil to produce elongated slots from the slits followed by bending the foil (during stretching) to produce channels having slotted top and bottom openings. In the broader sense of the invention, such approaches are intended to be covered in the channel forming foil aspects of the invention. It should be noted that slits 35 should preferably extend in a direction at an angle, preferably perpendicular, to the direction in which the foil is stretched to produce desired slot elongation. In FIG. 2, slits 35 extend longitudinally and foil 30 will be stretched transversely.

In the preferred embodiment, foil 30 is aluminum. Aluminum is particularly preferred because it is lightweight, inexpensive and has a demonstrated noncorrosive life. An alternative metal could be stainless steel, but for a number of reasons, stainless steel is not preferred. The gauge of aluminum foil in the preferred embodiment is 5.0 gram/ft$^2$ (stretched) and aluminum foil gauges of between about 3.0 to about 7.0 gm/ft$^2$ are believed acceptable for use in the invention. It is to be noted, that aluminum foil, at the thicknesses specified is not impervious to gas flow through the foil. However, when the foils are stacked, they are substantially impervious to gas flow through their walls. Further, the porosity of the foil to flow of gas through the foil will occur only at pressures and flow rates unacceptable to heat exchange systems. That is the pressure drop where gas can migrate through the wall of the foil will produce an unacceptable pressure drop to the substrate.

Figure 4A:
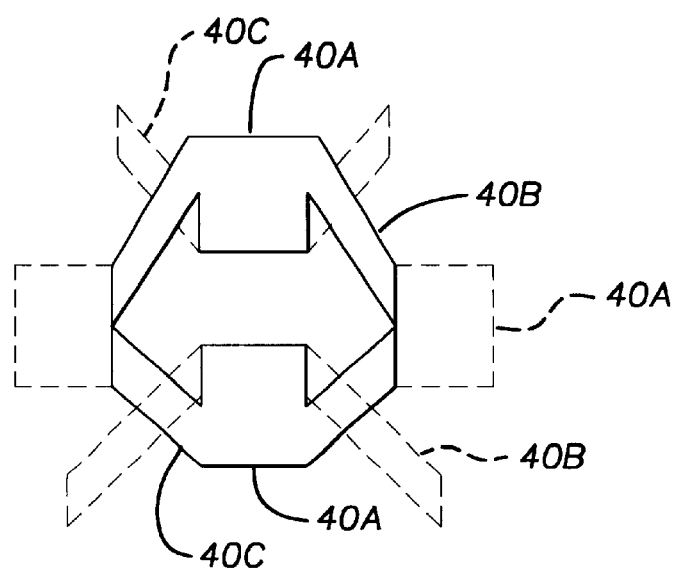
FIG. 4A is a pictorial representation of the walls forming one channel after a foil strip has been slitted.
Figure 3:
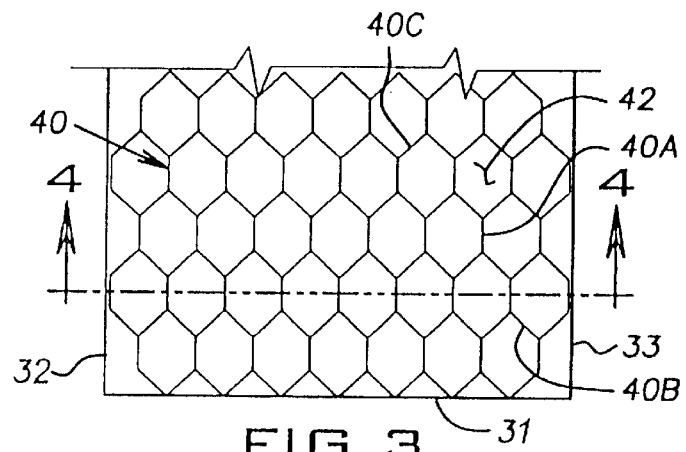
FIG. 3 is a schematic plan view of the foil showing unstretched channel walls.
Figure 4:
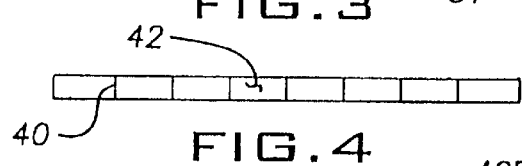
FIG. 4 is a schematic side view of the foil shown in FIG. 3 taken generally along the lines 4—4.

Referring now to FIGS. 3, 4 and 4A, foil sheet is slitted and stretched, drawn or bent into interconnected ribbons which form walls of channels 40 having rather large geometrically shaped passages or openings 42 extending therethrough. In the FIG. 3 plan view, the walls forming channels 40 take the form of a hexagon, which in practice, resembles more of a diamond configuration. Other channel shapes producing different geometric openings could be employed, such as rectilinear, oval etc. The hexagonal is preferred because it has all cuts at an angle to the stretch direction. The channels 40 may be formed by a machine which slits and forms a waffle pattern of repeating channels through foil sheet 30. Reference can be had to FIG. 4A which is a diagrammatical pictorial representation of channel 40. Hexagonal channel 40 has two tall side segments 40A which has slitted and bent therefrom upper 40B and lower 40C side wall segments or ribbons that interconnect to an adjacent tall side wall segments 40A of an adjacent and vertically offset channel. It is important to note for purposes of the invention that the length of channel 40 is significantly greater than the gauge of the foil and includes a surface area typically greater than a mesh and sufficient to receive and hold an ozone depleting substance coated thereon. Without any additional considerations, slitting the foil and forming channels having geometric patterns, rigidizes the foil since it is stretched beyond its elastic limit and incurs a permanent set. The size and spacing of the geometric pattern as well as the depth or length of channel 40 is a design consideration. Generally, for the aluminum foil of the preferred embodiment, a nominal unstretched channel depth of about 1 mm is utilized and this depth is conventional to HVAC air filters.

Each sheet of foil is then stretched and preferably twisted in a separate step from slitting described with reference to FIGS. 2 and 3. Conceptually, it may be possible to slit, stretch and twist in one operation. In practice, the steps can be separate. As shown in the partial plan schematic view of FIG. 5, foil 30 is preferably stretched at its sides or side edges 32, 33 to cause channels 40 to elongate and distort the geometric pattern of opening 42. In addition, foil 30 is twisted resulting in twisting of channel side wall segments 40A, 40B and 40C, most noticeably channel side wall segments 40B and 40C. This twisting materially increases the rigidity of sheets 30. Stretching and twisting foil 30 beyond its elastic limit, in addition to the operation whereat slitting occurred, significantly increases the rigidity of foil sheets 30 such that they retain their shape to form gas flowing channels 40 in fluid communication with adjacent channels in adjacent foil strips 30. The steps of cutting, stretching and twisting foil sheet 30 are conventional.

Figure 6:
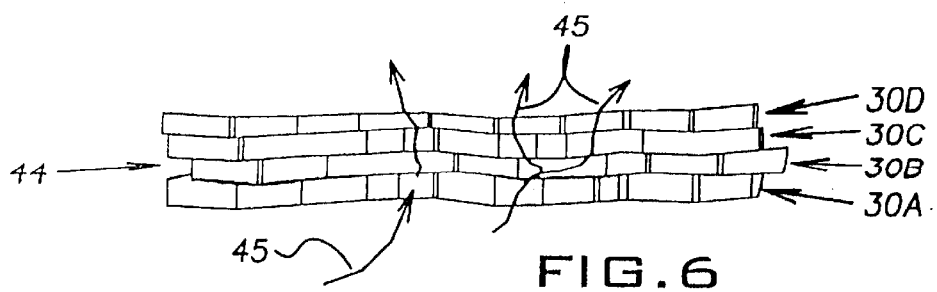
FIG. 6 is a schematic side representation of the stretched and slitted foil layered into a stack.

As schematically illustrated in FIG. 6, the rigidized foil sheets 30 are stacked one on top of the other to form a stack 44. When stretched and twisted, channels 40 of one foil sheet do not align with those of another sheet so that channel openings 42 of adjacent foil sheets 30 do not align with one another. The sheets can simply be placed one on top of the other to form stack 44 with channels 40 of adjacent foil sheets 30 inevitably being offset from one another. In the schematic illustration of FIG. 6, 4 foil sheets, 30A–30D are stacked to produce channels 40 offset from one another with the result that ozone atmosphere streamers 45 passing through stack 44 will be forced into a zig zag pattern contacting channel wall segments 40A–C which carry an ozone depleting substance. In practice, approximately 12–20 but conceivably anywhere between 12–40 foil sheets are arranged in stack 44.

Referring now to schematic FIG. 7, foil sheets 30 are stacked between an outside cover 50 and an inside cover 51 to form a sandwich substrate construction. In the preferred embodiment covers 50, 51 are aluminum. The gauge of inner and outer covers 50, 51 is significantly greater than foil sheets 30. In the preferred embodiment, covers 50, 51 have a gauge of between about 6 to 10 gm/ft$^2$. Openings 53 are formed in covers 50, 51 to provide ingress and egress of atmosphere to stack 44. In particular, covers 50, 51 are slitted and stretched. The slits, in the preferred embodiment, are in the form of a geometric pattern to provide geometrically shaped openings 52 as explained with reference to foil sheets 30. For illustration purposes, slits 35 illustrated in FIG. 2 are applied to covers 50, 51 so that when the covers are stretched, the slits open to elongated slots providing more metal mass to the covers when compared to foil sheets 30.

Referring now to FIG. 8, the substrate of the invention coated with an ozone depleting substance is schematically shown in its final assembled position and designated by reference numeral 55. The sandwich construction shown in FIG. 7 has been pleated from side 33 to side 32 into corrugations 60 of an undulating (sine wave) shape for at least two important reasons. First, the corrugations materially increase the rigidity of the substrate allowing its application with a minimal amount of bracing. Second, the corrugations materially increase the surface area of the substrate enhancing its conversion efficiency for any sized outlet duct 28. Additionally, the corrugations allow the substrate to be bent into a curvilinear shape. The substrate is held in its sandwich configuration by periodically positioned metal staples 61.

A curved application is generally illustrated in the schematic arrangement of a cylindrical condenser housing 62 somewhat typical of a residential air conditioner illustrated in FIG. 9. The air conditioner draws atmosphere streamer 24 through its side, shown as cylindrical, and exhausts atmosphere streamer 26 out from its top. The cylindrical a/c surface receiving substrate 55 is the curved a/c condenser which can be placed in the a/c housing inlet. Preferably substrate 55 is placed adjacent and downstream of the condenser coil to receive heated atmosphere. The ozone depleting substrate of the present invention can be bent and cut at the job site about its corrugations 60 to fit the cylindrical shape of the air conditioner and convert ozone atmosphere to a clean atmosphere. Because pleats 60 extend side-to-side they maintain the shape of the substrate against bowing or distorting from the air flow. Because channels 40 are discontinuous and the atmosphere snakes through the channels as described above, there is no change in the performance of the substrate if the corrugations are bent. This should be compared to the monolithic prior art substance illustrated in partial section in FIG. 10. In prior art monolithic substrate, passages 70 coated with an ozone depleting material must extend through the substrate from inside to outside and are rigidly affixed (not shown) to one another. Bending the monolithic substrate crushes several of the passages decreasing the efficiency of the device.

The ozone depleting substance which may be employed in accordance with the present invention are any compositions which can remove ozone from a gas containing the same. Such compositions include ozone catalyzing compositions, adsorbing compositions, absorbing compositions and the like. Among the most preferred catalytic materials for use in substrate 55 are ozone catalyzing compositions which contain manganese dioxide as explained in detail below.

Ozone catalyzing compositions for use in the present invention comprise manganese compounds including manganese dioxide, non stoichiometric manganese dioxide (e.g., $XMnO_{(1.5-2.0)}$), and/or $XMn_2O_3$ wherein X is a metal ion, preferably an alkali metal or alkaline earth metal (e.g., sodium, potassium and barium). Variable amounts of water ($H_2O$, $OH^-$) can be incorporated in the structure as well. Preferred manganese dioxides, which are nominally referred to as $MnO_2$ have a chemical formula wherein the molar ratio of oxide to manganese is about from 1.5 to 2.0. Up to 100 percent by weight of manganese dioxide $MnO_2$ can be used in catalyst compositions to treat ozone. Alternative compositions which are available comprise manganese dioxide and compounds such as copper oxide alone or copper oxide and alumina. Copper, however, is not preferred for an aluminum substrate.

Useful and preferred manganese dioxides are alphamanganese dioxides nominally having a molar ratio of oxygen to manganese of from 1 to 2. Useful alpha manganese dioxides are disclosed in U.S. Pat. No. 5,340,562 to O'Young, et al.; also in O'Young, "Hydrothermal Synthesis of Manganese Oxides with Tunnel Structures", presented at the *Symposium on Advances in Zeolites and Pillared Clay Structures* presented before the Division of Petroleum Chemistry, Inc., American Chemical Society New York City Meeting, Aug. 25–30, 1991, beginning at page 342; and in McKenzie, "The Synthesis of Bimessite, Cryptomelane, and Some Other Oxides and Hydroxides of Manganese", *Mineralogical Magazine,* December 1971, 5 Vol. 38, pp. 493–502. For the purposes of the present invention, the preferred alpha-manganese dioxide is selected from hollandite ($BaMn_8O_{16}.xH_2O$), cryptomelane ($KMn_8O1_6.xH2O$), manjiroite ($NaMn_8O_{16}.xH_2O$) or coronadite ($PbMn_8O_{16}.xH_2O$).

The manganese dioxides useful in the present invention may have a surface area as high as possible such as a surface area of at least 100 $m^2/g$. The composition preferably comprises a binder as of the type described below with preferred binders being polymeric binders. The composition can further comprise precious metal components with precious metal components being the oxides of precious metal, including the oxides of platinum group metals and oxides of palladium or platinum also referred to as palladium black or platinum black. The amount of palladium or platinum black can range from about 0 to 25%, with useful amounts being in ranges of from about 1 to 25 and from about 5 to 15% by weight based on the weight of the manganese component and the precious metal component.

It has been found that the use of compositions comprising the cryptomelane form of alpha manganese oxide, which also contain a polymeric binder can result in greater than 50%, preferably greater than 60% and typically from 75–85% conversion of ozone in a concentration range of up to 400 parts per billion (ppb).

The preferred cryptomelane can be made in accordance with methods described and incorporated into U.S. patent application Ser. No. 08/589,182 filed Jan. 19, 1996, incorporated herein by reference. The cryptomelane can be made by reacting a manganese salt including salts selected from the group consisting $MnCl_2$, $Mn(NO_3)_2$, $MnSO_4$, and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha-manganese dioxide useful in the present invention can contain one or more of hollandite, cryptomelane, manjiroite or coronadite compounds. Even when making cryptomelane minor amounts of other metal ions such as sodium may be present. Useful methods to form the alphamanganese dioxide are described in the above references which are each incorporated herein by reference.

The preferred alpha-manganese dioxide for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate.

It is believed that the carboxylates are burned off during the calcination process. However, inorganic anions remain on the surface even during calcination. The inorganic anions such as sulfates can be washed away with the aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The clean" alpha manganese dioxide is characterized as having an IR spectrum as disclosed in U.S. patent application Ser. No. 08/589,182 filed Jan. 19, 1996.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from about 50° C. to 110° C. The slurry is filtered and the filtrate is dried at a temperature range of from about 75° C. to 200° C. The resulting cryptomelane crystals have a surface area of typically in the range of at least 100 $m^2/g$.

Other ozone catalyzing compositions to remove ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from about 0.1 to 5 weight percent, with useful and preferred amounts of the catalyst composition volume, based on the volume of the supporting article, ranging from about 0.5 to about 70 g/ft$^3$. The amount of palladium component preferably ranges from about 2 to about 10 weight percent of the composition, with useful and preferred amounts on the catalyst composition volume ranging from about 10 to about 250 g/ft$^3$.

Various useful and preferred ozone catalyzing compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silicaalumina, silica zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 $\mu$m or in sol form also having a particle size ranging from about 1 to about 50 and preferably about 1 to about 10 $\mu$m. A useful titania sol support comprises titania having a particle size ranging from about 1 to about 10, and typically from about 2 to 10 $\mu$m.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450–500° C.

A useful support for the ozone catalyzing composition is selected from a refractory oxide support, preferably alumina and silica-alumina with a more preferred support being a silica-alumina support comprising from about 1% to 10% by weight of silica and from about 90% to 99% by weight of alumina.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Pat. No. 5,422,331 hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

The present invention may employ adsorption compositions supported on the gas contacting surface to remove ozone from a gas containing the same. The adsorption compositions can be used to adsorb ozone as well as other pollutants and particulate matter. Useful supported compositions can include adsorbents such as zeolite. Useful zeolitic compositions are described in Publication No. WO 94/27709, published Dec. 8, 1994 and entitled "Nitrous Oxide Decomposition Catalyst" hereby incorporated by reference. Particularly preferred zeolites are Beta zeolite, and dealuminated Zeolite Y.

Carbon, preferably activated carbon, can be formed into carbon adsorption compositions comprising activated carbon and binders such as polymers as known in the art. The carbon adsorption composition can be applied to the atmosphere contacting surface. Activated carbon, calcium sulfate and calcium oxide can adsorb ozone.

The present invention may also make use of absorption compositions to remove ozone. Examples of absorptions include the previously mentioned materials listed for adsorption compositions in which the materials have been exposed to a liquid.

In the broader scope of the invention, any of the ozone depleting substances discussed above may be used to coat channel walls 40A–C. In the preferred embodiment, a manganese oxide catalyst, of the compositions discussed above, without any flame retardant is preferred because of its high ozone conversion properties.

While foil stack 44 is conventional in that it is a conventional HVAC air filter, different considerations are present when foil stack 44 is coated and used as a part of a catalyst contact device. Obviously, the substrate has to promote or force atmosphere/catalyst contact while maintaining porosity at low pressure drop levels. It has been discovered for reasons discussed above that foil stack 44 can suitably function to meet this criteria. Additional considerations which must be addressed relate to the suitability of the ozone depleting coatings to function within the inventive corrugated substrate 55 in its real world environment. At the same time, it should also be noted that the beneficial characteristics of aluminum foil stack 44 when used as an air filter are also available when used as a catalyst contact device. Foil stack 44 will also trap air particulates and can be periodically cleansed by washing without significantly deteriorating the ozone conversion abilities of the catalyst. In addition, the aluminum has demonstrated non-corrosive, long life in the HVAC field and the addition of the ozone depleting catalyst is not expected to alter this result.

Figure 5:
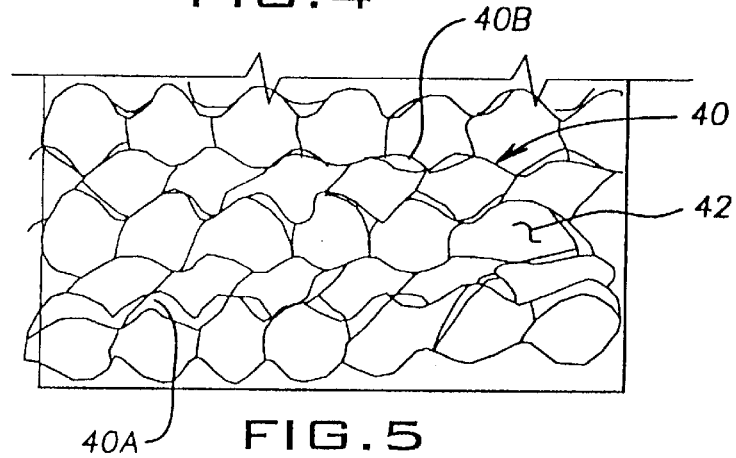
FIG. 5 is a schematic partial plan representation of a foil that has been slit, stretched and twisted.

The catalyst coating is generally coated onto the ozone depleting substrate using a catalyst slurry. The slurry is applied to the substrate, for example through dip-coating or spray-coating. Excess coating is then removed, if needed, by high pressure flow of air, i.e., an air-knife, and the resulting product is dried, for example at 90° C. It should also be pointed out that, compared to the composition of paint, the level of binder in the slurry is low and the catalyst remains exposed on the surface rather than being "buried" under the binder. The ozone depleting catalyst can be sprayed onto individual foil sheets 30 after they are stretched and twisted as shown in FIG. 5 or the entire corrugated sandwich can be spray coated or dipped. Coating the entire substrate 55 adds the catalytic surface area of covers 50, 51 and is acceptable because of adhesion qualities of the catalyst to the metal. Alternatively, the catalyst coating can conceivably be sprayed onto foil sheets 30 or substrate 55 in powder form.

As noted above, there can be adhesion issues associated with coating an ozone depleting catalyst onto a wire mesh substrate or a foam, i.e., polyurethane, substrate. The nature of this adhesion issue is two-fold. The first is the potential for removal of the coating upon physical contact with the surface, e.g., rubbing the surface. The second issue relates to the flaking of the coating upon folding and twisting of the insert. As noted in the discussion of the wire mesh substrate, the ozone depleting catalyst fills certain mesh openings. Flexing the substrate can dislodge the catalyst. In foam, a potential for a similar problem exists as a function of porosity and surface area and how the catalyst slurry dries.

The ozone depleting catalyst slurry is much better suited for the aluminum metal surface rather than foam surfaces. The adhesion properties, especially upon rubbing the surface, are definitely improved. Side-by-side tests have been carried out where coated pieces of metal and foam have been folded and twisted and the extent of flaking observed. The amount of flaking from the metal was significantly lower. It was also observed that the coated metal piece may result in some flaking upon the initial folding. This type of manipulation, however, imparts flexibility to the corrugated sandwich, and much less flaking takes place in subsequent movements. This feature is different from the foam that shows a more consistent flaking behavior.

In summary, there are two issues relating to the application of an ozone depleting catalyst to an ozone depleting substrate addressed by the invention. First, it seems to be easier to coat a metal surface. Secondly, in the case of the foam, there are pores/holes that can be plugged upon drying in a convoluted foam surface. In the corrugated invention substrate, the surfaces that are coated are the individual ribbons or wall channel segments 40A–C that are the building blocks of the structure. There is much less opportunity for plugging holes because there are no holes similar to those present in the foam.

Finally, the addition of covers 50, 51 while at the thicker gauges specified above materially render substrate 55 suitable for use in the on-site, retrofit applications of the invention. The covers materially increase the rigidity of substrate 55, especially when pleated into a corrugated or undulating shape, allowing it to be applied as a free standing insert with little or no framing or support issues. Yet substrate 55 can be cut and it can be rolled or bent about corrugations 60 allowing it to be coiled in a roll form for storage and transportation.

The invention has been described with reference to a preferred embodiment. Obviously, alterations and modifications will become apparent to those skilled in the art upon reading and understanding the Detailed Description of the Invention. It is intended to include all such modifications and alterations insofar as they come within the scope of the invention.

Having thus defined the invention, it is claimed:

1. An ozone substrate for heat exchange units comprising:
   a plurality of metal foil plies positioned one on top of the other to form a stack; each foil ply having a plurality of interconnected ribbons forming walls of a channel and comprising a plurality of channels adjacent one another, each channel having geometrically shaped openings and the plies stacked so that channel walls of overlying plies partially block channel openings of overlaid plies;
   a metal cover on each side of said stack to form a sandwich, said cover thicker than said foil plies, spanning said plies and having cover openings formed therein for fluid communication with channel openings in said stack; and,
   at least one of said plies having an ozone depleting substance applied to the channel walls thereof for removing ozone from ozone atmosphere as it passes through said sandwich.

2. The substrate of claim 1 wherein said sandwich is pleated from one edge to the other to form corrugations in said covers and said stack.

3. The substrate of claim 2 wherein said corrugations are in the form of a sinusoidal wave.

4. The substrate of claim 2 wherein said cover openings are in the form of a regularly repeating geometric patterns similar to the geometric configuration of said channels in said foil plies.

5. The substrate of claim 2 wherein said foil and said covers are aluminum.

6. The substrate of claim 2 further including a plurality of staples extending through said sandwich for maintaining said covers and said plies in their assembled relationship.

7. The substrate of claim 6 wherein selected walls in each channel are twisted and said walls are stretched to distort the geometric shape of said channel.

8. The substrate of claim 1 wherein said ozone depleting material lacks any flame retardant.

9. The substrate of claim 8 wherein said ozone depleting substance comprises manganese compounds including manganese dioxide, non stoichiometric manganese dioxide and/or $XMn_2O_3$ wherein X is a metal ion.

10. The substrate of claim 9 wherein said manganese dioxides have a molar ratio of oxygen to manganese of from 1 to 2.

11. A method for forming an ozone substrate for use in heat exchange systems comprising the steps of:
    a) slitting strips of metal foil into interconnected ribbons formed into channel walls having regularly repeating geometrically shaped openings extending throughout each foil strip;
    b) stretching and twisting each foil strips to distort the pattern of said geometric opening while twisting certain walls of each channel;
    c) stacking a plurality of said strips one on top the other so that channel walls of overlying foil strips partially block channel of overlaid foil strips;
    d) covering the top and bottom stacked strips with a thicker metal cover strip having openings therein to form a porous sandwich;
    e) pleating said sandwich including said cover strips into a corrugated form; and,
    g) applying an ozone depleting substance to at least said foil strips at the completion of steps (b) or (e).

12. The method of claim 11 further including the step of driving a staple through said cover strips and said foil strips when formed into a sandwich to secure the cover strips and foil together in said sandwich.

13. The method of claim 12 wherein said covers are slit into interconnected ribbons and ribbons formed into channel walls having regularly repeating geometrically shaped openings similar to the channel openings formed in said foil strips and stretching said cover strip to distort the shape of said cover strips.

14. The method of claim 13 wherein said ozone depleting substance is a manganese based catalyst sprayed in liquid form onto said foils or said sandwich followed by the steps of removing excess catalyst coating by gas flow at sufficient pressure to remove catalyst from blocking said channel openings while assuring catalyst coating of said channel walls followed by drying said catalyst to solid form.

15. The method of claim 13 wherein said ozone depleting substance is a manganese based catalyst applied in liquid form by dipping said foils or said sandwich into a catalyst vat followed by the steps of removing excess catalyst coating by gas flow at sufficient pressure to remove catalyst from blocking said channel openings while assuring catalyst coating of said channel walls followed by drying said catalyst to solid form.

16. The method of claim 13 wherein said ozone depleting substance is a catalyst lacking any fire retardant and said metal is aluminum.

17. The method of claim 13 further including the step of coiling said sandwich into a roll for shipping.

18. The method of claim 17 further including the step of cutting said sandwich from said roll to the size of an opening through which ozone containing atmosphere flows.

19. A heat exchange arrangement comprising:
   a) a heat exchange system including a heat exchanger, a fan and a motor;
   b) a housing containing said heat exchange system; said housing having an inlet for drawing atmosphere into contact with said heat exchanger and an outlet for exhausting said atmosphere as spent atmosphere after contact with said heat exchanger;
   c) a substrate spanning said outlet through which said spent atmosphere passes as it is exhausted from said housing; said substrate including
   i) a plurality of metal foil plies positioned one on top of the other to form a stack; each foil ply having a plurality of interconnected ribbons forming walls of a channel and comprising a plurality of channels adjacent one another spanning the ply, each channel having geometrically shaped openings and the plies stacked so that channel walls of overlying plies partially block channel openings in overlaid plies;
   ii) a metal cover on each side of said stack to form a sandwich, said cover thicker than said foil plies, spanning said plies and having cover openings formed therein for fluid communication with channels openings in said stack; and,
   iii) at least one of said plies having an ozone depleting substance applied to the walls thereof for removing ozone from ozone atmosphere as it passes through said sandwich.

20. The heat exchange system of claim 19 wherein said sandwich is pleated from one edge to the other to form corrugations in said covers and said stack.

21. The heat exchange system of claim 20 wherein said cover openings are in the form of a regularly repeating geometric patterns similar to the geometric configuration of said channels in said foil plies, said geometric configuration of said openings being distorted.

22. The heat exchange system of claim 21 wherein said ozone depleting substance comprises manganese compounds including manganese dioxide, non stoichiometric manganese dioxide and/or $XMn_2O_3$ wherein X is a metal ion, and said ozone depleting material applied to substantially all surfaces of said sandwich.

* * * * *